(12) United States Patent
Miyoshi et al.

(10) Patent No.: US 10,652,498 B2
(45) Date of Patent: May 12, 2020

(54) PHOTOELECTRIC CONVERSION DEVICE, IMAGE CAPTURING DEVICE, AND PHOTOELECTRIC CONVERSION METHOD

(71) Applicant: Ricoh Company, Ltd., Tokyo (JP)

(72) Inventors: Yuuya Miyoshi, Osaka (JP); Tohru Kanno, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/029,946

(22) Filed: Jul. 9, 2018

(65) Prior Publication Data

US 2019/0028665 A1 Jan. 24, 2019

(30) Foreign Application Priority Data

Jul. 18, 2017 (JP) .................. 2017-139325

(51) Int. Cl.
 H04N 5/378 (2011.01)
 H04N 5/3745 (2011.01)
 H04N 5/369 (2011.01)
 H04N 5/365 (2011.01)
 H04N 5/361 (2011.01)
 H04N 5/357 (2011.01)

(52) U.S. Cl.
 CPC .......... H04N 5/378 (2013.01); H04N 5/3575 (2013.01); H04N 5/361 (2013.01); H04N 5/3658 (2013.01); H04N 5/36963 (2018.08); H04N 5/37455 (2013.01)

(58) Field of Classification Search
 CPC ..... H04N 5/3745–37455; H04N 5/378; H04N 5/3355; H04N 5/357–3675; H04N 5/3765

USPC ......... 348/308, 241, 607, 909, 908; 358/463
See application file for complete search history.

(56) References Cited

U.S. PATENT DOCUMENTS

| 8,106,987 B1* | 1/2012 | Vu ........................ H04N 5/3575 341/155 |
| 2009/0256735 A1* | 10/2009 | Bogaerts .............. H04N 5/3575 341/169 |
| 2010/0277607 A1* | 11/2010 | Choi .................. H04N 5/35554 348/222.1 |
| 2013/0162870 A1 | 6/2013 | Miyoshi et al. |

(Continued)

FOREIGN PATENT DOCUMENTS

| JP | 2004-357135 | 12/2004 |
| JP | 2006-025189 | 1/2006 |

(Continued)

*Primary Examiner* — Xi Wang
(74) *Attorney, Agent, or Firm* — Xsensus LLP

(57) ABSTRACT

A photoelectric conversion device includes a pixel block including a plurality of pixels, a signal generating block, and a signal processing block. Each of the plurality of pixels includes a photoelectric conversion element to photoelectrically convert light striking the photoelectric conversion element into pixel data and output the pixel data; and a reset unit to reset electrical charge of the photoelectrically converted pixel data light and output a reset signal. The signal generating block includes a reference signal generator to generate a reference signal. The signal processing block performs correlated double sampling (CDS) on the reference signal to obtain correction data, and perform CDS on the pixel data and the reset signal to generate an output signal to correct the output signal with the correction data.

16 Claims, 18 Drawing Sheets

(56) References Cited

U.S. PATENT DOCUMENTS

| | | | | |
|---|---|---|---|---|
| 2014/0117204 A1* | 5/2014 | Ha | ............... | H04N 5/3559 |
| | | | | 250/208.1 |
| 2015/0189209 A1* | 7/2015 | Yang | ............... | H04N 5/378 |
| | | | | 348/300 |
| 2016/0358958 A1 | 12/2016 | Miyoshi et al. | | |
| 2017/0244844 A1 | 8/2017 | Miyoshi et al. | | |

FOREIGN PATENT DOCUMENTS

| JP | 2012-065106 | 3/2012 |
|---|---|---|
| JP | 2014-207631 | 10/2014 |
| JP | 2015-128221 | 7/2015 |
| JP | 2017-005427 | 1/2017 |
| JP | 2017-147663 | 8/2017 |

* cited by examiner

FIG. 11A

PROCESSING SYSTEM PS1

| IDLING 1 | IDLING 5 | DUMMY PIXEL DATA 1 | DUMMY PIXEL DATA 5 | DUMMY PIXEL DATA 9 | DUMMY PIXEL DATA 13 | PIXEL DATA 1 | PIXEL DATA 5 | ... |

- IDLING 1 ... IDLING 5: OBTAINED DUMMY PIXEL DATA IS NOT USED AS CORRECTION DATA
- DUMMY PIXEL DATA 1 ... DUMMY PIXEL DATA 13: CORRECTION DATA
- PIXEL DATA 1 ... PIXEL DATA 5 ...: VALID IMAGE DATA

FIG. 11B

PROCESSING SYSTEM PS2

| IDLING 2 | IDLING 6 | DUMMY PIXEL DATA 2 | DUMMY PIXEL DATA 6 | DUMMY PIXEL DATA 10 | DUMMY PIXEL DATA 14 | PIXEL DATA 2 | PIXEL DATA 6 | ... |

- IDLING 2 ... IDLING 6: SAME NUMBER OF OPERATIONS AS IN PROCESSING SYSTEM 1 IN WHICH DUMMY PIXEL DATA IS NOT USED AS CORRECTION DATA
- DUMMY PIXEL DATA 2 ... DUMMY PIXEL DATA 14: CORRECTION DATA
- PIXEL DATA 2 ... PIXEL DATA 6 ...: VALID IMAGE DATA

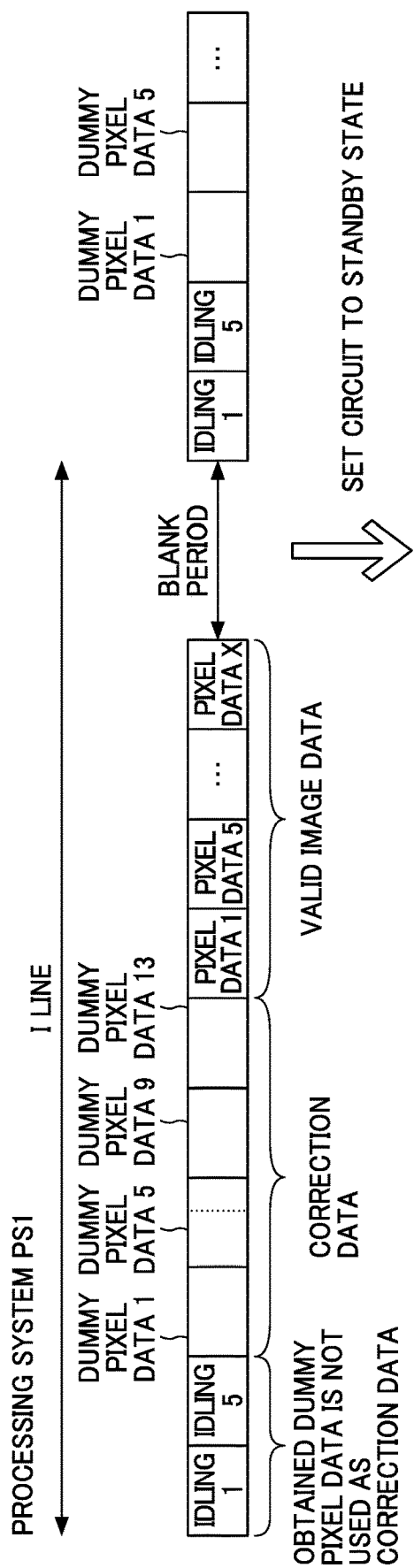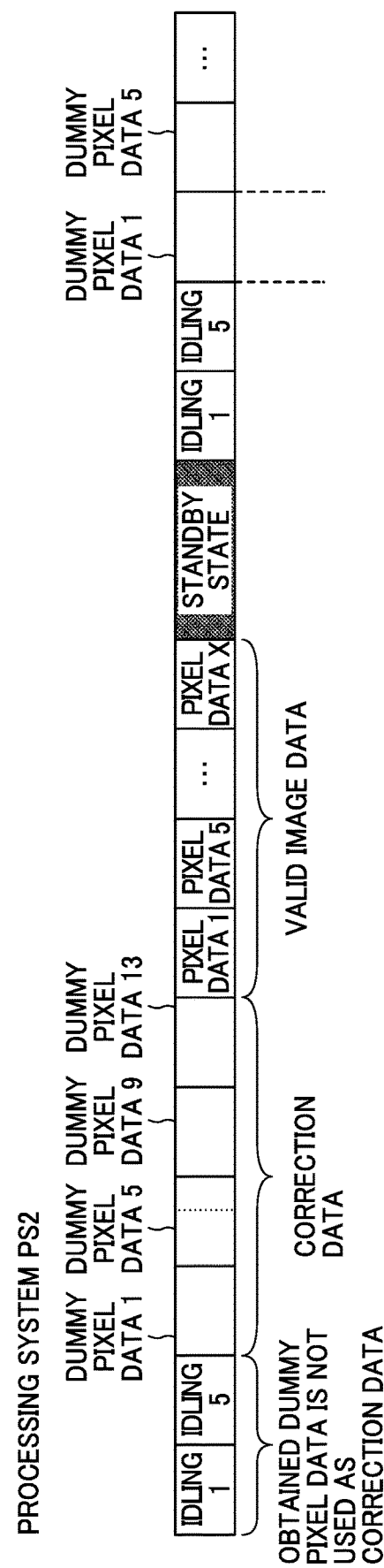

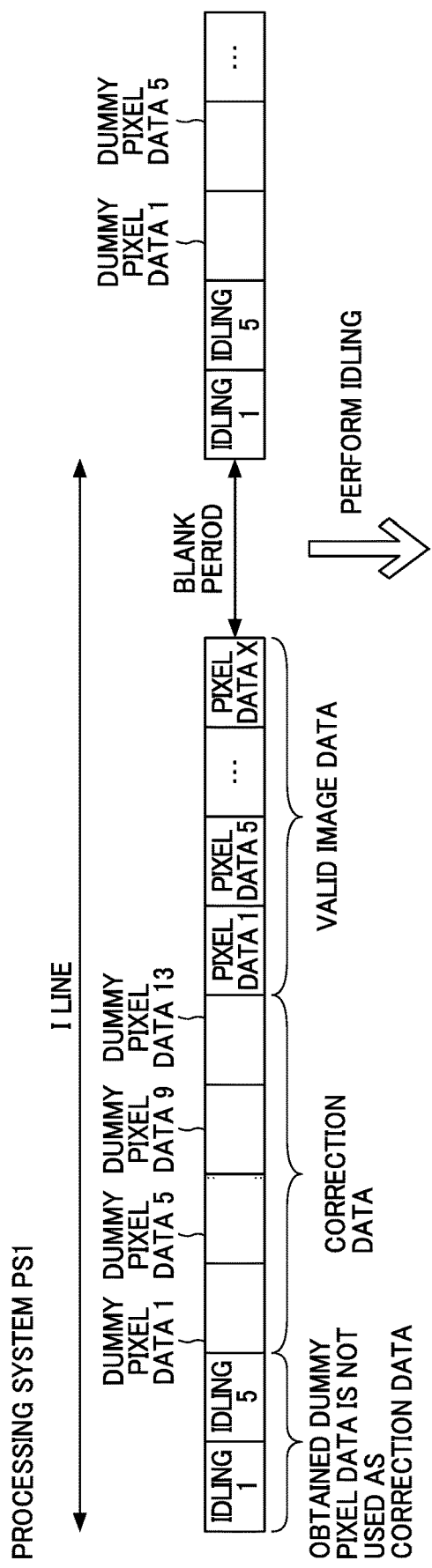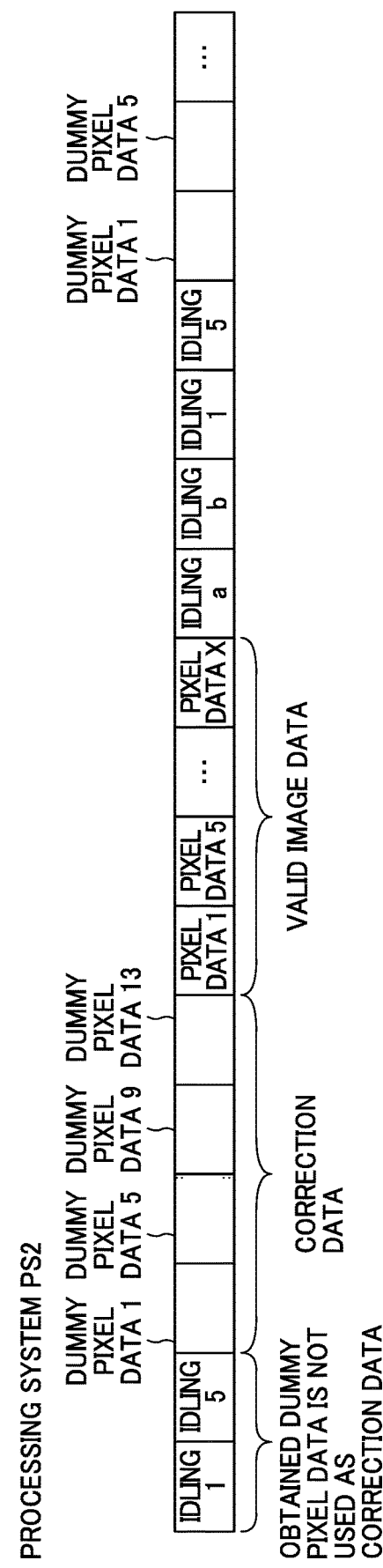

PHOTOELECTRIC CONVERSION DEVICE, IMAGE CAPTURING DEVICE, AND PHOTOELECTRIC CONVERSION METHOD

CROSS-REFERENCE TO RELATED APPLICATION

This patent application is based on and claims priority pursuant to 35 U.S.C. § 119(a) to Japanese Patent Application No. 2017-139325, filed on Jul. 18, 2017 in the Japan Patent Office, the entire disclosure of which is hereby incorporated by reference herein.

BACKGROUND

Technical Field

Embodiments of the present disclosure relate to a photoelectric conversion device, an image capturing device incorporating the photoelectric conversion device, and a photoelectric conversion method.

Background Art

The photoelectric conversion devices are formed to include a pixel block to perform photoelectrical conversion, a signal processing block, and a drive block to drive the pixel block and the signal processing block.

The photoelectric conversion device is manufactured using complementary metal oxide semiconductor (CMOS) technology that integrates the pixel block, the signal block, and the drive block into one device. Such photoelectric conversion devices are used in image capturing devices such as digital still cameras, video cameras, and copying machines.

As the signal processing block of the photoelectric conversion device, a programmable gain amplifier (PGA) and an analog-to-digital (A/D) converter are used. Digital correlated double sampling method (D-CDS), in which the signal processing block performs analog-to-digital (A/D) conversion on a reset signal and a signal output from the pixel block and obtain the difference between the reset signal and the signal, is used to eliminate noise from the output signals.

SUMMARY

In one aspect of this disclosure, there is provided an improved photoelectric conversion device includes a pixel block including a plurality of pixels, a signal generating block, and a signal processing block. Each of the plurality of pixels includes a photoelectric conversion element to photoelectrically convert light striking the photoelectric conversion element into pixel data and output the pixel data; and a reset unit to reset electrical charge of the photoelectrically converted pixel data light and output a reset signal. The signal generating block includes a reference signal generator to generate a reference signal. The signal processing block performs correlated double sampling (CDS) on the reference signal to obtain correction data, and perform the CDS on the pixel data and the reset signal to generate an output signal to correct the output signal with the correction data.

In another aspect of this disclosure, there is provided an improved photoelectric conversion method involving photoelectrically converting light striking a photoelectric conversion element of a pixel block into pixel data and outputting the pixel data; resetting an electrical charge of the photoelectrically converted pixel data and outputting a reset signal; generating a reference signal; performing correlated double sampling (CDS) on the reference signal to obtain correction data; performing CDS on the pixel data and the reset signal to generate an output signal; and connecting the output signal with the correction data.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 11A and 11B are illustrations of dummy pixel data and pixel data with a plurality of processing systems;

FIGS. 12A and 12B are illustrations of a relation between a blank period and power consumption according to an embodiment of the present disclosure;

FIGS. 13A and 13B are illustrations of dummy pixel data and pixel data when circuits are idle during the blank period;

Figure 1:
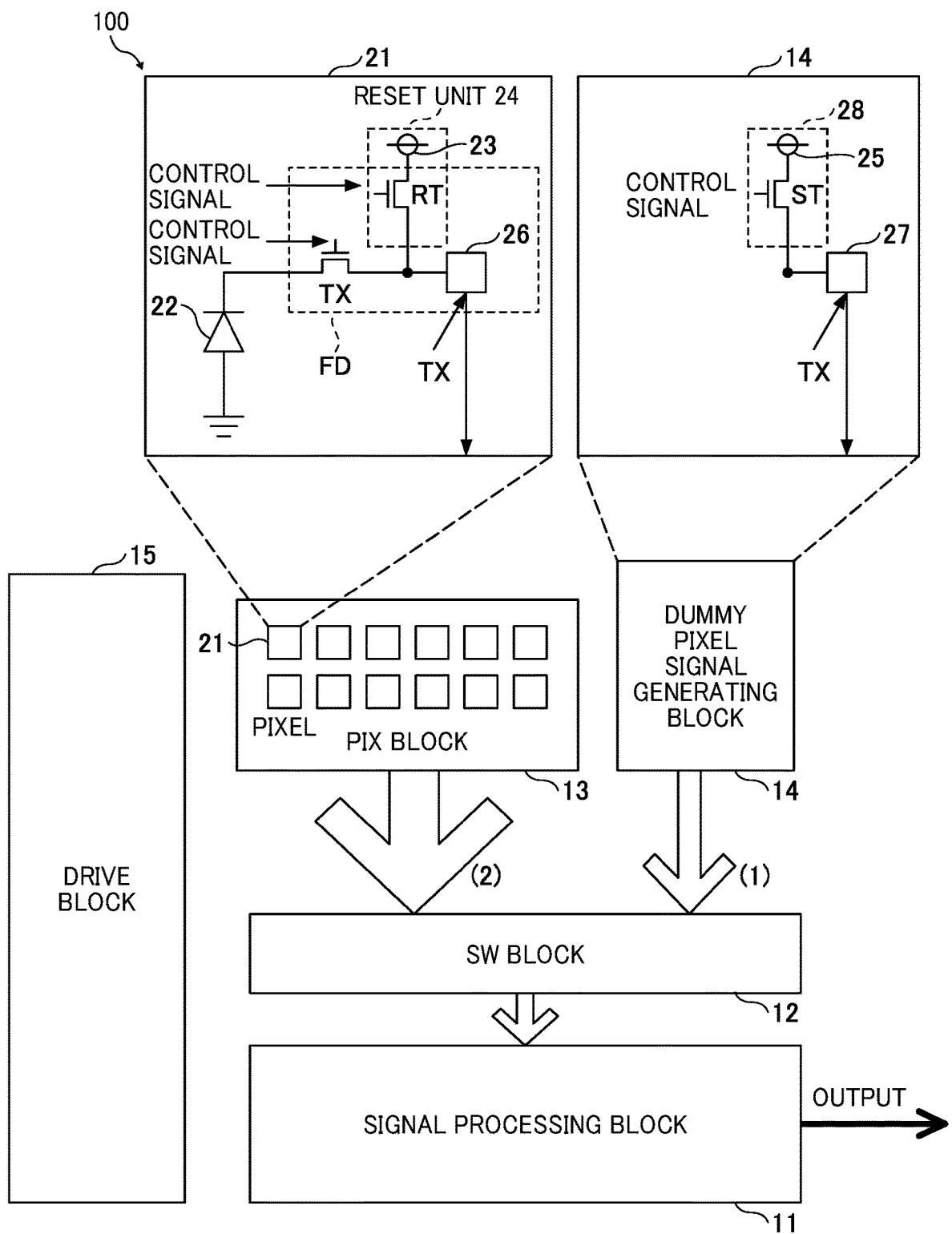
FIG. 1 is a block diagram illustrating a schematic configuration of a photoelectric conversion device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

Embodiments of the present disclosure are described with reference to the drawings. Note that like reference signs denote like elements among the drawings for purposes of simplification.

Hereinafter, a photoelectric conversion device 100 and a photoelectric conversion method performed by the photoelectric conversion device 100 are described according to an embodiment of the present disclosure with reference to the drawings.

FIG. 1 is a block diagram illustrating a schematic configuration of a photoelectric conversion device 100 according to an embodiment of the present disclosure. The photoelectric conversion device 100 includes a drive block 15, a pixel block 13, a dummy pixel signal generating block 14, a switch (SW) block 12, and a signal processing block 11.

The pixel block 13 includes a plurality of pixels 21 each of which converts light into a voltage. In the pixel block 13, each pixel 21 includes a photoelectric conversion element (photodetector (PD)) 22, a reset unit 24, and at least one amplifier circuit 26 as a first amplifier circuit. The PD 22 photoelectrically converts light (photons) striking the PD 22 into an electrical signal. The reset unit 24 resets the photoelectrically converted electrical charge of the pixel.

More specifically, the anode of the PD 22 of each pixel 21 is connected to ground and the cathode is connected to one end of a transfer switch TX. The other end of the transfer switch TX is connected to the amplifier circuit 26 (for example, a source follower) and a reset switch RT. The reset switch RT and the reset power source 23 together constitute the reset unit 24.

In each pixel 21, there is a floating diffusion area FD in which the transfer switch TX, the amplifier circuit 26, and the reset switch RT are connected to each other. In the floating diffusion region FD, charge-voltage conversion is performed.

A reset voltage Vrd is applied to the reset switch RT from the reset power source 23. Note that at least one of a color filter and a microlens may be formed above the PD 22 (the viewpoint side with respect to the drawing).

The reset switch RT, the transfer switch TX, the PD 22, and the amplifier circuit 26 together constitute one pixel 21. Each of the reset switch RT and the transfer switch TX is formed by, for example, an N-channel transistor (N type transistor).

The dummy pixel signal generating block 14 includes a reference signal generator 28 and at least one amplifier circuit 27 as a second amplifier circuit. The reference signal generator 28 generates a reference signal to be output irrespective of the presence or absence of light. The reference signal generator 28 includes a switch ST and a reference voltage power source 25.

The dummy pixel signal generating block 14 outputs a signal that is a dummy pixel signal. The dummy pixel signal is set to the same level as the level of the reset signal generated in the pixel block 13.

For example, the reset voltage Vrd of the reset power source 23 and the reference voltage Vdd of the reference voltage power source 25 are set to the same level or regarded as the same level. Accordingly, noise that depends on the signal level is equalized between the signal of the dummy pixel signal generating block 14 and the signal of the pixel block 13.

To eliminate other types of noise attributed to the drive capability, the drive capabilities of the pixel 21 and the dummy pixel signal generating block 14 are equalized. That is, the same circuit is used for the reset unit 24 in each pixel 21 and the reference signal generator 28 in the dummy pixel signal generating block 14, and the same circuit is used for the amplifier circuit 26 of each pixel 21 and the amplifier circuit 27 of the dummy pixel signal generating block 14.

The SW block 12 switches between the signal from the pixel block 13 and the signal from the dummy pixel signal generating block 14 and outputs the signal to the signal processing block 11.

The signal processing block 11 performs amplification, clamping, and signal processing (for example, analog-correlated double sampling (A-CDS)) on the signal photoelectrically converted by the pixel block 13 and the signal output by the dummy pixel signal generating block 14.

The drive block 15 outputs control signals to drive the pixel block 13, the dummy pixel signal generating block 14, and the SW block 12.

The signal processing block 11 processes signals generated by the dummy pixel signal generating block 14, and then corrects signals output from the pixel block 13 using the processed signal to eliminate fixed pattern noise. That is, the signal processing block 11 processes the signal of the dummy pixel signal generating block 14 before processing the signal of the pixel block 13. However, the order of signal processing is not limited thereto.

In the present embodiment, each pixel 21 does not have to obtain a correction signal, i.e., a clamp signal. That is, there is no need to obtain signals corresponding to the reset signals of all the pixels 21. Accordingly, the configuration according to the present embodiment can reduce the amount of data to be subjected to the A/D conversion, which can downsize the A/D convertor. That is, the chip size is reduced, and accordingly the cost can be reduced.

A description is given of the reset unit 24 of each pixel 21. The reset unit 24 resets the electrical charge photoelectrically converted and held by the PD 22. The signal reset by the reset unit 24 is a signal (reset signal Vr) to be output from the pixel 21 irrespective of the presence or absence of light.

By contrast, the signal photoelectrically converted by the PD 22 is a signal (signal Vs) to be output from the pixel 21 upon light striking the PD 22.

The reset signal and the signal include shared noise such as reset noise Vn. To eliminate such shared noise, the signal processing block 11 performs correlated double sampling (CDS) by obtaining a difference between the reset signal and the signal to obtain a valid pixel signal.

In this case, the signal processing block 11 digitally processes the signals, which means that the signal processing block 11 performs digital correlated double sampling (D-CDS). Even if such shared noise is eliminated, other noise a that is not shared between the reset signal and the signal remains in the valid signal. Accordingly, the valid signal is calculated by the following equation:

Valid signal=$(Vr+Vn)-(Vs+Vn)+\alpha=Vr-Vs+\alpha$.

In the present embodiment, A-CDS is used to obtain the difference between the reset signal and the signal. A detailed description of A-CDS will be given later.

For the sake of simplicity, the reset noise Vn (the shared noise) is assumed not to exist in the following description.

The signal processing block 11 performs A-CDS on the signals output from each of the pixel block 13 and the dummy pixel signal generating block 14.

For example, the signal processing block 11 first performs the A-CDS on the signal output from the dummy pixel signal generating block 14 to generate dummy pixel data that is to be used for correction and accordingly sometimes referred to as correction data. A method of generating correction data will be described later. The signal processing block 11 then performs A-CDS on the signal output from the pixel block 13 to obtain a processed signal, which is to be corrected with the correction data.

Among the pixels 21 in the pixel block 13 of FIG. 1, a plurality of pixels 21 shares the common amplifier circuit 26. Such a configuration can reduce the circuit area. In this case, one amplifier circuit 26 is connected to the plurality of pixels 21 in the pixel block 13.

Figure 2A:
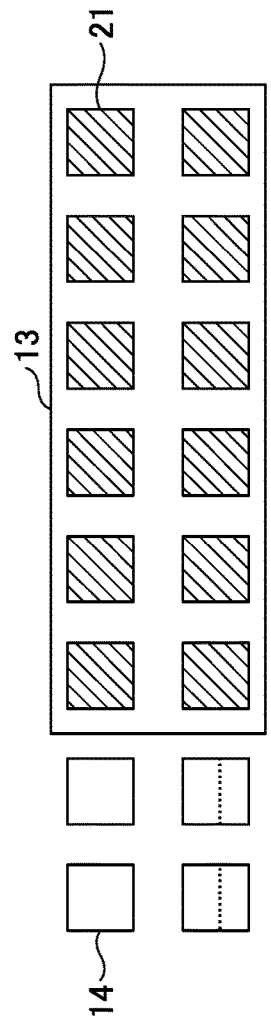
FIGS. 2A, 2B, and 2C are illustrations of an arrangement of dummy pixel signal generating blocks according to embodiments of the present disclosure.
Figure 2B:
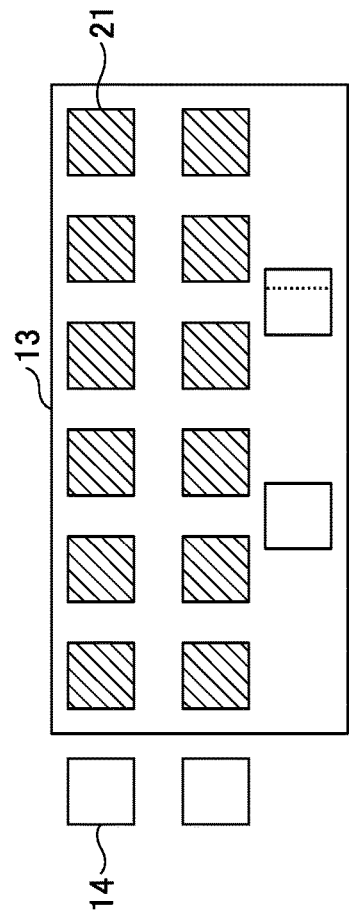
Figure 2C:
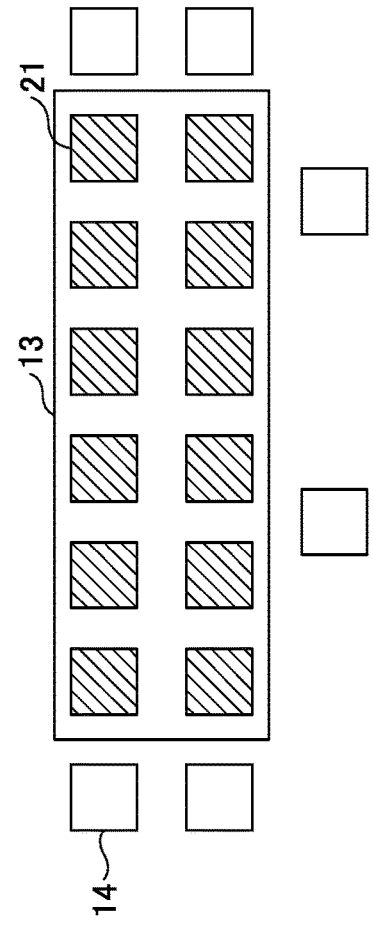

FIGS. 2A, 2B, and 2C are illustrations of an arrangement of the dummy pixel signal generating blocks 14 according to embodiments of the present disclosure. However, no limitation is intended thereby. The arrangement of the dummy pixel signal generating blocks 14 may be designed as appropriate.

In FIGS. 2A, 2B, and 2C, a plurality of dummy pixel signal generating blocks 14 is arranged in parallel to the pixel block 13.

First, in FIG. 2A, four dummy pixel signal generating blocks 14 are arranged adjacent to the pixel block 13 in the longitudinal direction of the pixel block 13, and twelve pixels 21 are arranged in the interior of the pixel block 13.

In FIG. 2B, as compared to FIG. 2A, four dummy pixel signal generating blocks 14 and twelve pixels 21 are arranged. However, two of the four dummy pixel signal generating blocks 14 are arranged adjacent to the pixel block 13 in the longitudinal direction of the pixel block 13 and the remaining two are arranged in the interior of the pixel block 13.

In FIG. 2C, two dummy pixel signal generating blocks 14 are arranged adjacent to each side of the pixel block in the longitudinal direction of the pixel block 13. Two other dummy pixel signal generating blocks 14 are arranged adjacent to the pixel block 13 in a direction vertical to the longitudinal direction of the pixel block 13.

The signal processing block 11 eliminates the random noise component from the output signal by calculating the average of the signals of the plurality of dummy pixel signal generating blocks 14.

In FIG. 2A, the signals of the dummy pixel signal generating blocks 14 gathered at one place are averaged. Alternatively, instead of such an arrangement, the dummy pixel signal generating blocks 14 may be dispersed as illustrated in FIGS. 2B and 2C to obtain the averages of the signals. The dispersed arrangement of the dummy pixel signal generating blocks 14 can eliminate or reduce the effect on the calculated average of any differences between signals that depend on the position (position dependency).

Figure 3:
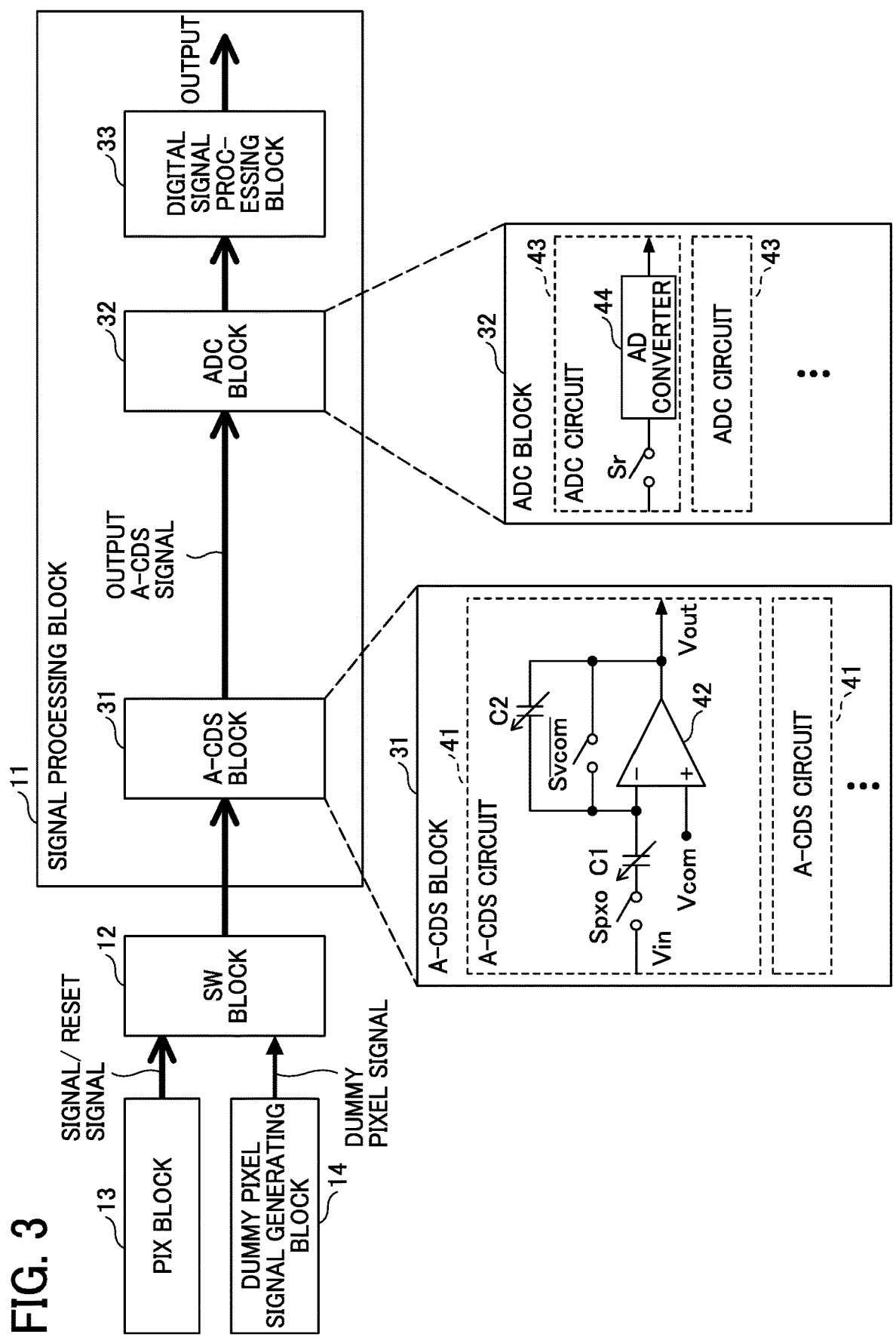
FIG. 3 is an illustration of functions of a signal processing block according to an embodiment of the present disclosure.

FIG. 3 is a block diagram illustrating the functions of the signal processing 11 according to an embodiment of the present disclosure.

The signal processing block 11 receives the reset signal and the signal from the pixel block 13 through the SW block 12. The signal processing block 12 also receives the dummy pixel signal from the dummy pixel signal generating block 14 through the SW block 12.

The signal processing block 11 includes an A-CDS block 31 and an ADC block 32. The A-CDS block 31 of the signal processing block 11 receives the reset signal and the signal.

The A-CDS block 31 includes a plurality of A-CDS circuits 41.

Each A-CDS circuit 41 includes a differential amplifier circuit 42. The differential amplifier circuit 42 has a positive electrode to receive the clamp reference voltage Vcom and a negative electrode to receive a signal Vout output from the differential amplifier circuit 42 and fed back through a capacitor C2 and a switch Svcom, which are connected in parallel.

In the A-CDS circuit 41, when the switch Svcom is closed (ON), the output of the differential amplifier circuit 42 is fed back to the negative electrode and the differential amplifier circuit 42 outputs the clamp reference voltage Vcom. When the switch Svcom is open (OFF), the output of the differential amplifier circuit 42 is accumulated in the capacitor C2.

In the following description, cases are described in which the A-CDS circuit 41 receives signals in order of the signal of a first pixel 21-1, the reset signal of the first pixel 21-1, the signal of a second pixel 21-2, and the reset signal of the second pixel 21-2.

However, no limitation is intended thereby. In some examples, the A-CDS circuit 41 receives the signals in order of the reset signal of the first pixel 21-1, the reset signal of the second pixel 21-2, the signal of the first signal 21-1, and the signal of the second pixel 21-2.

The A-CDS circuit 41 clamps the signal with the clamp reference voltage Vcom. The term "clamp" means fixing the output signal to the clamp reference voltage Vcom in this case.

Subsequently, the A-CDS circuit 41 receives a reset signal. The A-CDS circuit 41 amplifies the difference between the previously received signal and the subsequently received reset signal, and outputs an A-CDS signal. A detailed description of the A-CDS signal will be given later with reference to FIG. 4.

When the pixel block 13 outputs none of the signal and the reset signal, the A-CDS circuit 41 opens a switch Spxo to fix the voltage Vin input to the negative electrode at a certain level. However, without the switch Spxo, the A-CDS circuit 41 is able to perform the clamp and amplification operation. In the following description, cases in which the switch Spxo is disposed in the A-CDS circuit 41 are described.

The ADC block 32 includes one or more ADC circuits 43 each including a switch Sr and an AD convertor 44. The ADC circuit 43 performs AD conversion on the A-CDS signal (converts an analog signal into a digital signal), and outputs the converted signal to a digital signal processing block 33.

Figure 4:
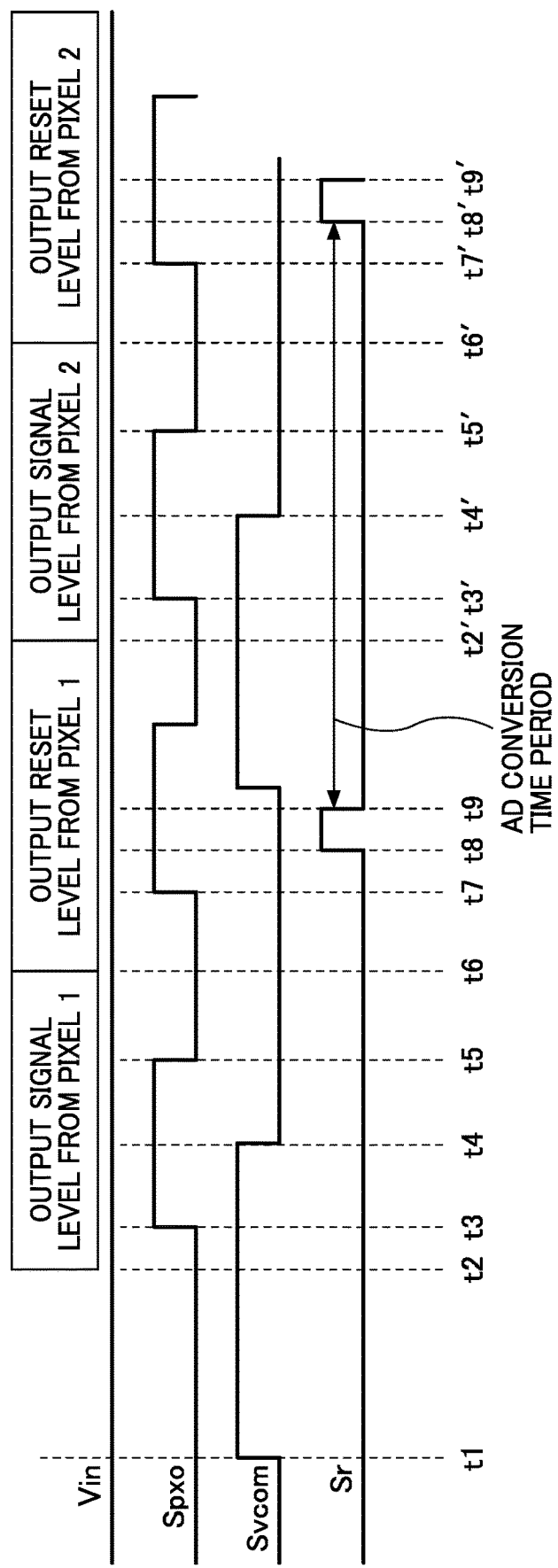
FIG. 4 is a timing chart of operations of an A-CDS circuit according to an embodiment of the present disclosure.

FIG. 4 is a timing chart of operations of the A-CDS circuit 41 according to an embodiment of the present disclosure. The operations at time t1 to time t9 will be described.

The operations at time t2' to time t9' are the same as the operations at time t2 to time t9.

t1: The switch Spxo opens and the switch Svcom is closed.

The differential amplifier circuit 42 feeds back the signal and outputs the clamp reference voltage Vcom as the voltage Vout.

t2: The first pixel 21-1 starts outputting a signal. In this case, the switch Spxo is open so that there is no change in the voltage Vout.

t3: The switch Spxo is closed (the switch Spxo is conductive). Accordingly, the signal from the first pixel 21-1 passes through the switch Spxo to the capacitor C1 and the electrical charge of the signal is accumulated in the capacitor C1.

When C1 denotes the capacitance of the capacitor C1 and Vs denotes the signal output from the first pixel 21-1, the electrical charge Q1 to be accumulated in the capacitor C1 is obtained by the following equation:

$$Q1 = C1 \times (Vcom - Vs).$$

In this case, the switch Svcom is closed, and accordingly the A-CDS circuit 41 clamps the signal of the first pixel 21-1 to the clamp reference voltage Vcom to output the voltage Vout.

t4: The clamp level is determined when the switch Svcom is opened.

That is, Vout is equal to Vcom (Vout=Vcom). Further, electrical charge starts accumulating in the capacitor C2.

t5: The switch Spxo opens. Accordingly, the size of the electrical charges accumulating in the capacitors C1 and C2 are determined. The electrical charges are stored in the capacitors C1 and C2.

t6: The pixel block 13 starts outputting a reset signal instead of the signal. In this case, the switch Spxo remains open, and accordingly there is no change in the electrical charges stored in the capacitors C1 and C2.

In FIG. 4, the pixel block 13 alternately outputs the signal and the reset signal in a sequential manner. In some examples, the pixel block 13 may output midpoint potential in the middle of the signal output operation.

t7: The A-CDS circuit 41 stars receiving the reset signal when the switch Spxo is closed with the switch Svcom open. In this case, the switch Svcom remains open, and accordingly the same total amount of electrical charges is maintained in the capacitors C1 and C2 on the input side of the differential amplifier circuit 42.

The voltage to be input to the capacitor C1 has been changed from the signal Vs of the pixel block 13 to the reset signal Vr of the pixel block 13. The electrical charge ((Vr−Vs)*C1) corresponding to the difference in voltage between the signal Vs and the reset signal Vr flows to the capacitor C2.

As a result, the A-CDS circuit 41 outputs the voltage Vout obtained by the following equation: Vout=Vcom−(Vr−Vs)× C1/C2. This output voltage Vout is the A-CDS signal.

Note that, when the capacitors C1 and C2 are variable capacitors, the amplification factor can be freely changed.

In the present embodiment, amplification is performed only by the A-CDS circuit 41. In some examples, the ADC circuit 43 may perform amplification (and also change the ADC reference voltage level) in consideration of the circuit size and the degree of difficulty of the circuit design.

t8: The ADC circuit 43 starts sampling the A-CDS signal when the switch Sr is closed.

t9: When the switch Sr is opened to end the sampling operation of the ADC circuit 43, the AD convertor 44 stars the AD conversion.

Figure 5:
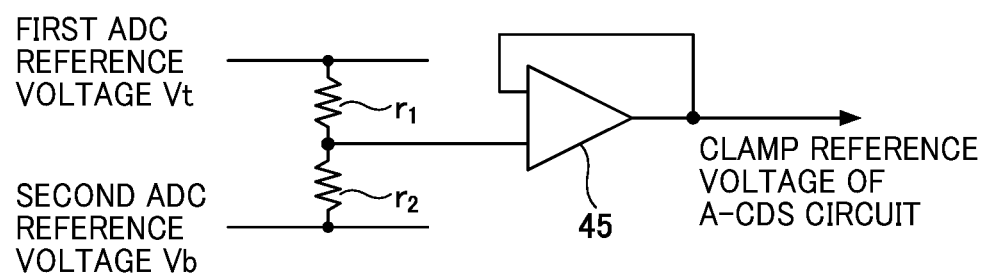
FIG. 5 is a circuit diagram describing a clamp reference voltage Vcom.

FIG. 5 is a circuit diagram of the clamp reference voltage Vcom.

In FIG. 5, the difference between the ADC top-side reference voltage Vt and the ADC bottom-side reference voltage Vb are divided by resistors r1 and r2, and input to the positive electrode of the operational amplifier 45.

Thus, the operational amplifier 45 outputs a voltage of a value intermediate between the ADC top-side reference voltage Vt and the ADC bottom-side reference voltage Vb.

The level of the clamp reference voltage Vcom may be the same as the level of the ADC reference voltage. However, the clamp reference voltage Vcom is set to a value intermediate between the ADC top-side reference voltage Vt and the ADC bottom-side reference voltage Vb to prevent the clamp reference voltage Vcom from exceeding the conversion range of the ADC due to noise and offset.

Further, in order to increase the dynamic range of the ADC even a little, the difference between the ADC top-side reference voltage Vt, the ADC bottom-side reference voltage Vb, and the clamp reference voltage Vcom is minimized. Thus, the clamp reference voltage Vcom is generated from the ADC top-side reference voltage Vt and the ADC bottom-side reference voltage Vb.

Figure 6:
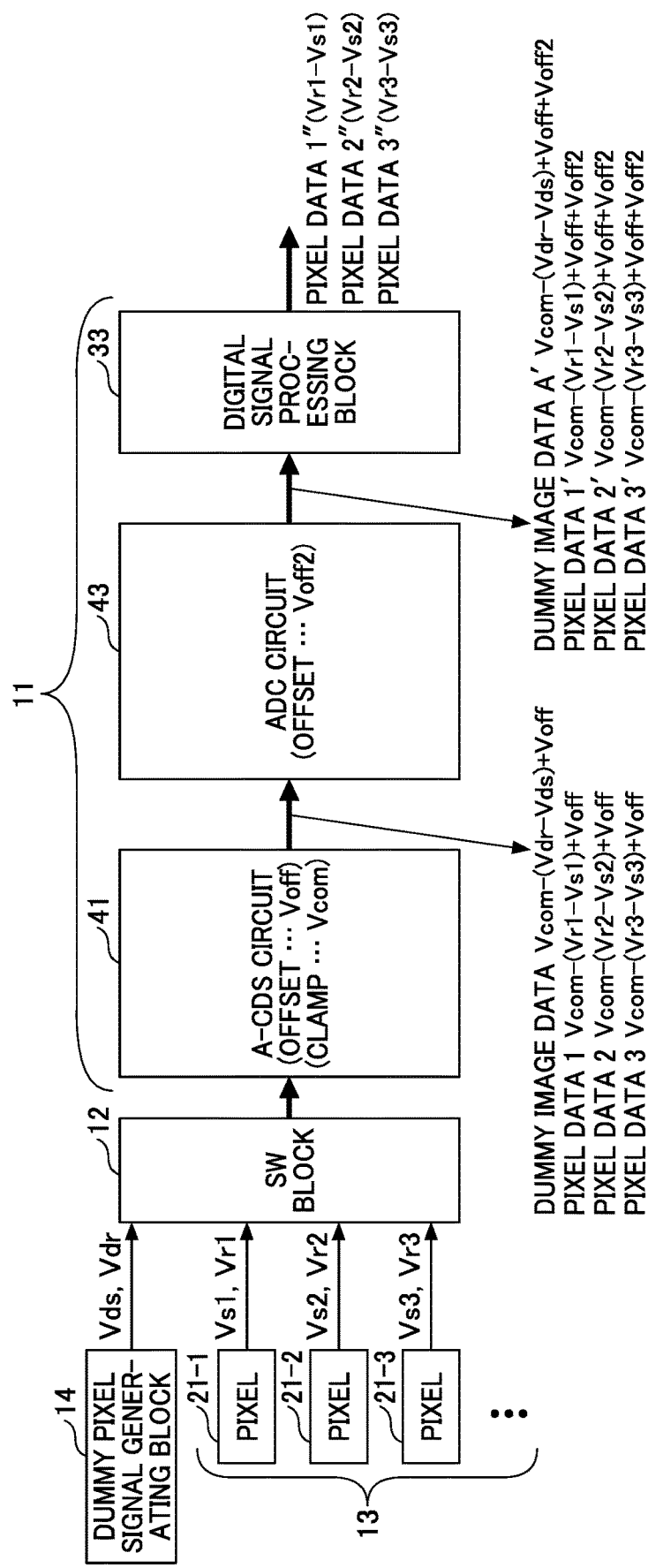
FIG. 6 is a block diagram illustrating a correction operation using dummy pixel signals according to an embodiment of the present disclosure.

FIG. 6 is a block diagram illustrating a correction operation using dummy pixel signals according to an embodiment of the present disclosure. The signal processing block 11 includes the A-CDS circuit 41, the ADC circuit 43, and the digital signal processing block 33.

Analog circuits such as the A-CDS circuit 41 and the ADC circuit 43 have certain fixed offset components Voff and Voff2.

The A-CDS circuit 41 receives the reset signal Vr and the signal Vs output from the pixel block 13, and receives a dummy reset signal Vdr and a dummy signal Vds output from the dummy pixel signal generating block 14.

Each of the dummy reset signal Vdr and the dummy signal Vds is a signal output from the reference signal generator 28 and amplified by the reference voltage source 25.

Thus, the dummy reset signal Vdr is equal to the dummy signal Vds.

Prior to the A-CDS processing performed on the signal and the reset signal output from the pixel block 13, the A-CDS circuit 41 clamps the dummy pixel signal to the clamp level Vcom and performs the A-CDS processing.

As a result, the A-CDS circuit 41 outputs the dummy reset signal Vdr and the dummy signal Vds output from the dummy pixel signal generating block 14 as a signal of (Vcom−(Vdr−Vds)+Voff).

Similarly, the A-CDS circuit 41 outputs Vcom−(Vr1−Vs1)+Voff) as a signal output from the first pixel 21-1, and outputs Vcom−(Vr2−Vs2)+Voff) as a signal output from the second pixel 21-2.

The ADC circuit 43 performs AD conversion on the signals output from the A-CDS circuit 41, which means that the offset Voff2 is added to the output signals.

The signals output from the ADC circuit 43 are as follows: The following signals, which have been subjected to the AD conversion, are actually digital data.

Dummy pixel signal(dummy image data A'): Vcom−(Vdr−Vds)+Voff+Voff2     (A');

First pixel(Pixel 21-1)signal(data): Vcom−(Vr1−Vs1)+Voff+Voff2     (1'); and

Second pixel(Pixel 21-2)signal(data): Vcom−(Vr2−Vs2)+Voff+Voff2     (2').

As described above, the dummy reset signal Vdr is equal to the dummy signal Vds. Accordingly, originally intended image signals (Vr1−Vs1) and (Vr2−Vs2) are obtained by subtracting the dummy pixel signal (A') from the first pixel signal (1') ((1')−(A')) and by subtracting the dummy pixel signal (A') from the second pixel signal (2') ((2')−(A'), respectively in the digital signal processing block 33.

That is, the originally intended image signal is obtained by obtaining the difference between the A-CDS signal of the signal output from the dummy pixel signal generating block 14 and the A-CDS signal of the signal output from the pixel block 13.

Thus, the dummy pixel signal (A') is correction data. As the dummy pixel signal is preliminarily subjected to the A-CDS processing, correction can be made at each time the A-CDS signal of the pixel 21, such as the first pixel 21-1 and the second pixel 21-2, is generated. This configuration can reduce the chip size and the cost.

A supplementary description will be given of the fact that the signal (dummy pixel signal) output from the dummy pixel signal generating block 14 is set to the same level as the level of the reset signal generated in the pixel block 13.

When the dummy reset signal Vdr and the dummy signal Vds are greatly different from the signal Vr1, the A-CDS circuit 41 might obtain the signal (Vcom−(Vdr−Vds)+Voff 3). In this case, it is desirable that Vcom−(Vdr−Vds)+Voff is obtained.

For example, the offset of the amplifier is not a fixed offset with respect to any input level. Instead, the offset greatly changes with the input level.

For example, some offsets change in proportion to the input level, and some offsets suddenly increase when falling below a certain level.

In the present embodiment, the dummy pixel signal generating block 14 is designed to output the same level signal as the signal level of the pixel 21, to equalize the levels of signals input to the A-CDS circuit 41. Thus, the Voff can be equalized between the dummy signals and the signals from the pixel 21.

Figure 7:
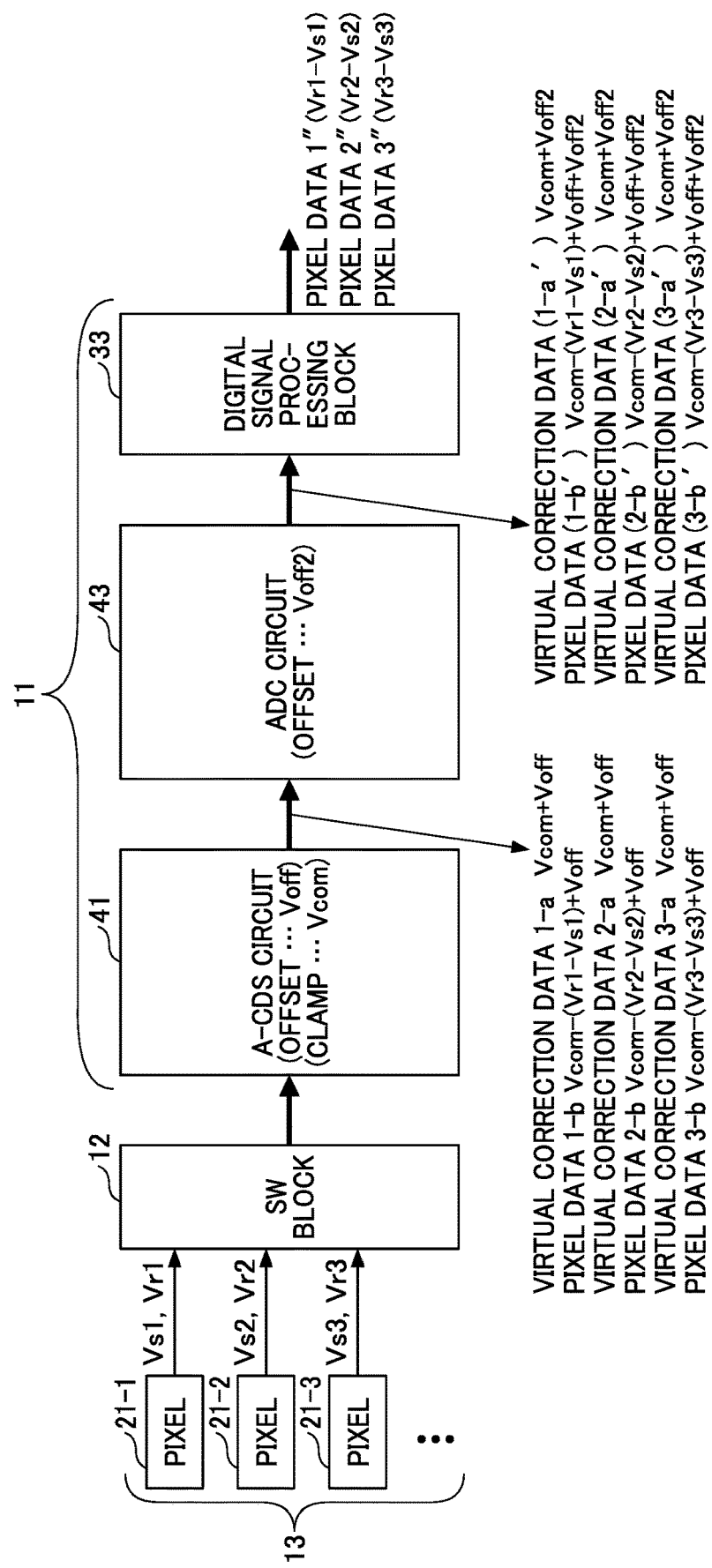
FIG. 7 is a block diagram illustrating signal processing in the absence of a dummy pixel signal generating block according to a comparative example.

FIG. 7 is a block diagram illustrating signal processing without the dummy pixel signal generating block 14 according to a comparative example.

Similarly with FIG. 6, the signal processing block 11 includes the A-CDS circuit 41, the ADC circuit 43, and the digital signal processing block 33. The offset components of the A-CDS circuit 41 and the ADC circuit 43 are the same as in FIG. 6.

The A-CDS circuit 41 clamps the signal from the pixel block 13 to the clamp level Vcom, and outputs the A-CDS signal.

As a result, the A-CDS circuit 41 outputs signals (Vcom−(Vr1−Vs1)+Voff) and (Vcom+Voff) as a signal read from the first pixel 21-1. Note that Vdr and Vds are both zero because the dummy pixel signal generating block 14 is not included.

Further, the A-CDS circuit 41 outputs signals (Vcom−(Vr2−Vs2)+Voff) and (Vcom+Voff) as signals read out from the second pixel 21-2.

Subsequently, the ADC circuit 43 adds offset Voff 2 into the signals output from the A-CDS circuit 43 through the AD conversion. The output data of the ADC circuit 43 is as follows:

Virtual correction data: $Vcom+Voff+Voff2$ (1-a');

First Pixel(Pixel 21-1): $Vcom-(Vr1-Vs1)+Voff+Voff2$ (1-b');

Virtual correction data . . . $Vcom+Voff+Voff2$ (2-a'); and

Second Pixel(Pixel 21-2): . . . $Vcom-(Vr2-Vs2)+Voff+Voff2$ (2-b').

The digital signal processing block 33 subtracts the virtual correction data (1-a') from the pixel data (1-b') to obtain an originally intended image signal (Vr1−Vs1), and the virtual correction data (2-a') from the pixel data (2-b') to obtain an originally intended image signal (Vr2−Vs2).

However, the number of times that the AD conversion is performed differs greatly between the comparative example and the present embodiment. For example, the case is compared between the comparative example and the present embodiment in which the pixel block 13 includes 1000 pixels to be processed by the signal processing block 11.

In the present embodiment, 1001 sets of pixel data, which are the sum total of one dummy pixel data and 1000 sets of pixel data (1+1000=1001), are subjected to the AD conversion.

In the comparative example, 2000 sets of data obtained by multiplying two sets of data for each pixel by 1000 pixels (2×1000=2000) are subjected to the AD conversion.

As a result, the AD conversion is more frequently performed in the comparative example by 999 times than the present embodiment does in the case in which the pixel block 13 includes 1000 pixels to be subjected to the AD conversion.

In the present embodiment, there is no need to obtain virtual correction data (particularly, clamp reference voltage Vcom) for each pixel, which means that there is no need to obtain data corresponding to the reset signals for all pixels. This configuration according to the present embodiments can significantly reduce the number of sets of data to be subjected to the AD conversion.

Thus, the ADC block 32 can be reduced in size. In other words, the chip size and cost can be reduced.

In FIG. 7, it is conceivable that the AD conversion is performed on the virtual correction data (1-a'), the pixel data (1-b'), and the pixel data (2-b') in sequence, and then the virtual correction data (2-a') and (3-a') is corrected with the virtual correction data (1-a').

However, in such a case, only the virtual correction data (1-a') is repeatedly used, which might lead to difficulty in obtaining sufficient correction effects (e.g., only the first pixel 21-1 outputs a signal having characteristics different from those of the signals of other pixels. Thus, the correction method according to the comparative example would be invalid.

When there is a plurality of A-CDS circuits 41 and a plurality of ADC circuits 43, a combination of one A-CDS circuit 41 and one ADC circuit 43, which constitutes a processing system, performs the correction operation, thus producing valid results. Each of the A-CDS circuits 41 and the ADC circuit 43 has a different offset.

Figures 8A, 8B:
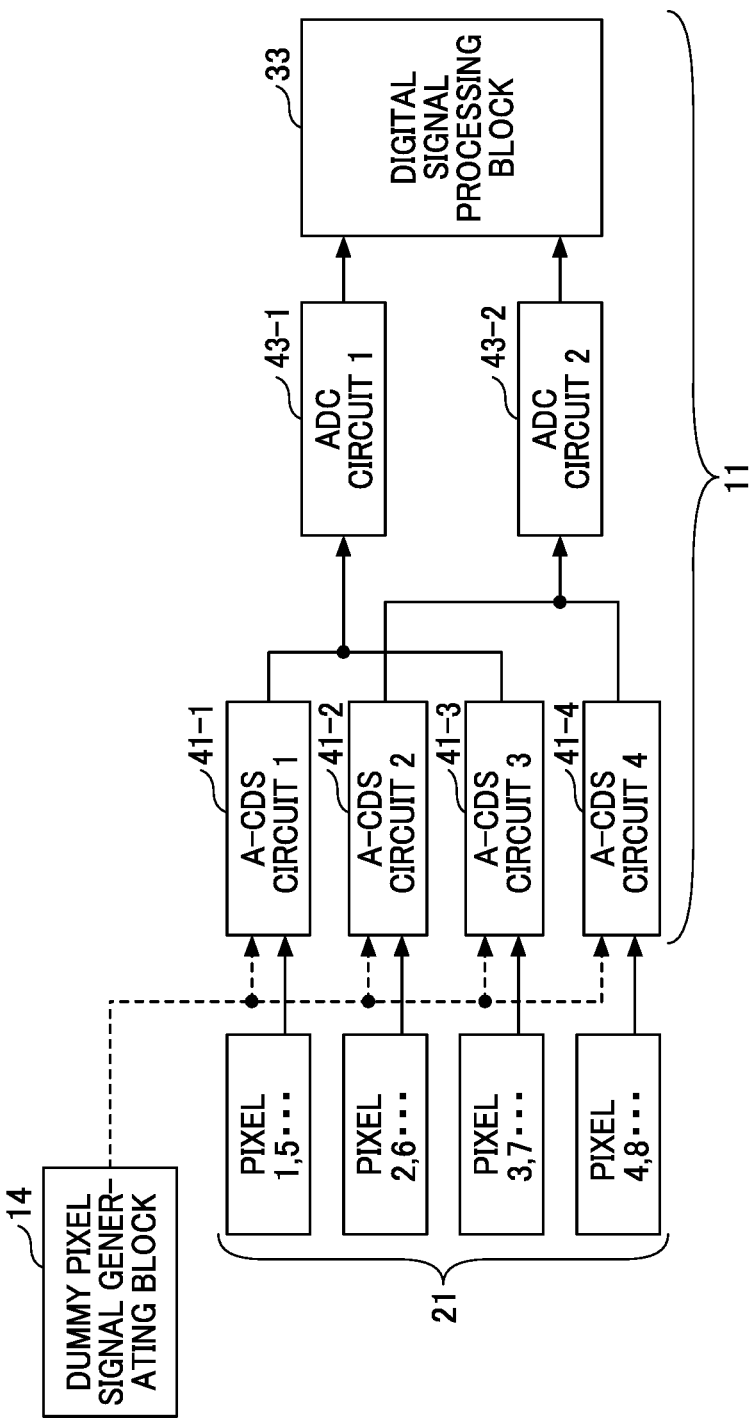
FIG. 8A is a block diagram illustrating a correction operation performed by each processing system.
FIG. 8B is an illustration of the processing systems.

FIG. 8A is a block diagram illustrating a correction operation performed by each processing system PS according to an embodiment of the present disclosure. FIG. 8B is an illustration of processing systems PS.

FIG. 8A represents several combinations of the A-CDS circuits 41 and the ADC circuits 43, and FIG. 8B represents the processing systems PS to be extracted by the combinations of the A-CDS circuits 41 and the ADC circuits 43.

In FIG. 8A, there are four A-CDS circuits 41-1 through 41-4 and two ADC circuits 43-1 and 43-2.

The A-CDS circuits 41-1 and 41-3 are connected to the ADC circuit 43-1, and the A-CDS circuits 41-2 and 41-4 are connected to the ADC circuit 43-2. As illustrated in FIG. 8B, there are four processing systems PS1 through S4.

To correspond to the four processing systems PS1 through PS4, the dummy pixel signal generating block 14 outputs four sets of dummy pixel data to be processed. The digital signal processing block 33 corrects data for each system.

That is, the pixel data 1 and 5 outputted through the processing system PS1 are corrected with the dummy pixel data output from the dummy pixel signal generating block 14 through the processing system PS1. The same applies to the other three processing systems PS2 through PS4.

Figure 9A:
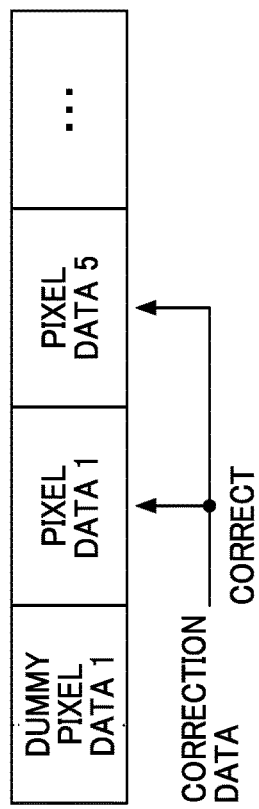
FIGS. 9A and 9B are illustrations of correction operations performed using a plurality of pieces of dummy pixel data according to an embodiment of the present disclosure.
Figure 9B:
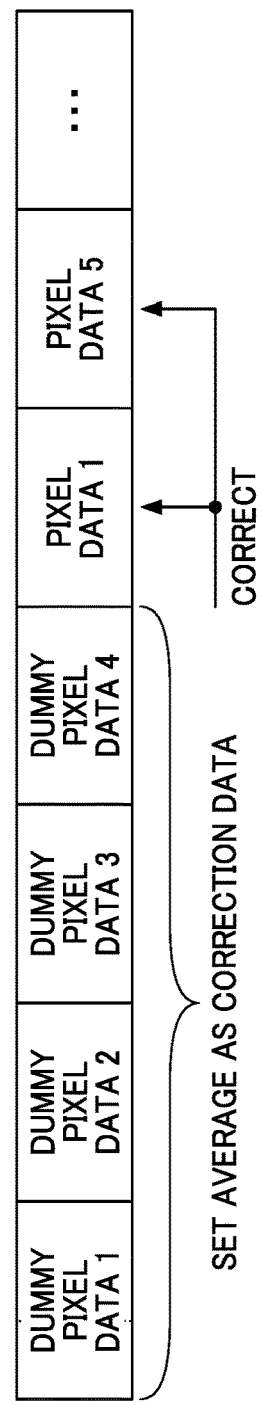

As illustrated in FIGS. 9A and 9B to be described below, one or more dummy pixel data (i.e., one or more sets of two signals Vdr and Vds) is used for each processing system PS.

FIGS. 9A and 9B are illustrations of different configurations of the correction operation using one or more sets of dummy pixel data.

In FIG. 9A, the pixel data 1 and 5 are corrected by one dummy pixel data 1 corresponding to the processing system PS1.

However, in FIG. 9B, four sets of dummy pixel data 1 through 4 are generated from one processing system PS. The digital signal processing block 33 receives the dummy pixel data 1 through 4 generated from one processing system PS, and obtains the average of the dummy pixel data 1 through 4 to correct the pixel data 1 and 5 with the obtained average. Thus, the random noise components can be removed.

The dummy pixel data output from the unstable dummy pixel signal generating block 14 might not be reliable data, which is unavailable for the correction of pixel data. A detailed description will be given of the state of the dummy pixel signal generating block 14 with reference to FIG. 10.

Figure 10:
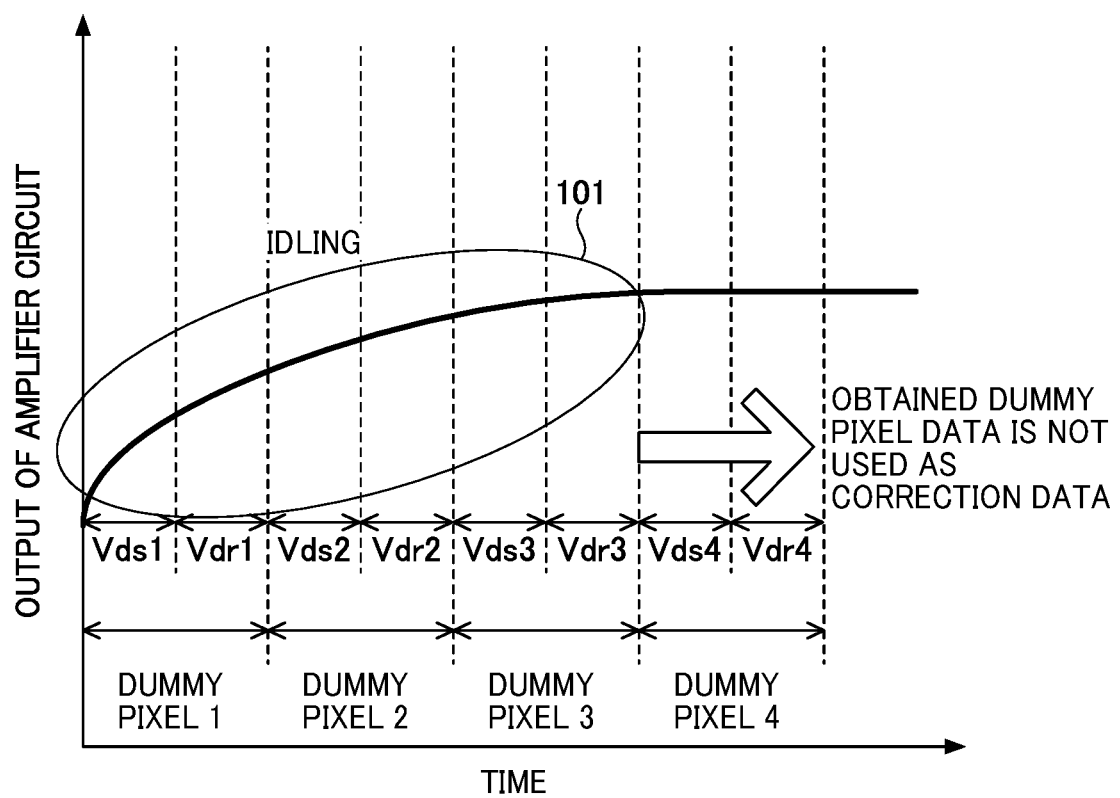
FIG. 10 is a graph of a temporal change in level of signals output from the dummy pixel signal generating block in FIG. 1.

FIG. 10 is a graph of a temporal change in levels of signals Vds and Vdr output from the dummy pixel signal generating block 14.

For a short while after the dummy pixel signal generating block 14 has started operating, i.e., in the initial state of the dummy pixel signal generating block 14, (i) the reference voltage is unstable, and (ii) there is a significant change in load in the dummy pixel signal generating block 14. For such reasons, the dummy pixel signal generating block 14 at the initial state outputs the wrong dummy reset signal Vdr and dummy signal Vds having the wrong values.

Such a phenomenon is hereinafter referred to as the state in which the circuit is unstable. The dummy pixel data of the signals output from such an unstable circuit (unstable dummy pixel signal generating block 14) is not appropriate to use as correction data.

In FIG. 10, the dummy pixel signal generating block 14 alternately outputs the signal Vds and the signal Vdr, and the output level of the signals gradually becomes stable over time. The time until the output level becomes stable corresponds to the time elapsed since the photoelectric conversion device 100 has been activated (turned on).

During the time period from when the photoelectric conversion device 100 has been turned on to when the dummy pixel signal generating block 14 becomes stable (that is, the output level becomes stable), the photoelectric conversion device 100 is configured to operate the dummy pixel signal generating block 14, the A-CDS circuit 41, and the ADC circuit 43 without using the dummy pixel data as the correction data.

Such an operation to avoid using obtained dummy pixel data as the correction data is hereinafter referred to as idling operation. During the idling operation of the dummy pixel signal generating block 14, the A-CDS circuit 41, and the ADC circuit 43, the dummy pixel signal generating block 14, the A-CDS circuit 41, and the ADC circuit 43 become stable. Then, the photoelectric conversion device 100 is configured to use, as the correction data, the dummy pixel data generated from the stable dummy pixel signal generating block 14, to correct pixel data obtained from the pixel block 13.

The dummy pixel data 101 in FIG. 10 is obtained during the idling operation of the circuits, and accordingly is not used as the correction data. Note that the frequency or the length of time of the idling operation is predetermined.

In the present embodiment, the dummy pixel signal generating block 14 is subjected to the idle running operation. This configuration eliminates the need for providing an additional block to be subjected to the idle running operation, and facilitates the idling operation due to a simple design that enables the idling operation to be performed merely by changing the control timing.

FIGS. 11A and 11B are illustrations of dummy pixel data and pixel data when there is a plurality of processing systems PS.

FIG. 11A represents data to be processed by the processing system PS1, and FIG. 11B represents data to be processed by the processing system PS2.

When there is a plurality of processing systems PS to process data, the circuits of each processing system PS are subjected to the idling operation to be stabilized.

Note that all the processing systems PS use the same type of circuit, and accordingly the circuit takes substantially the same time to become stable between the processing systems PS.

For this reason, the number of idling operations to be performed is the same for all the processing systems PS. Performing the idling operation the common number of times enables the photoelectric conversion device 100 to have a simple design and eliminates differences in characteristics between the processing systems PS.

In FIG. 11, the idling operation occurs twice in each processing system PS.

Figure 12C:
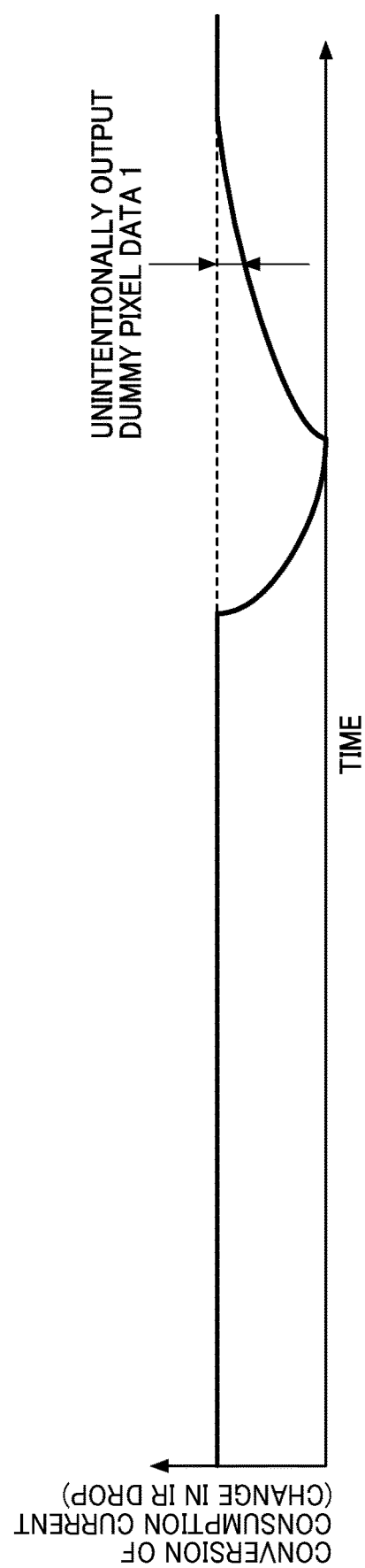
FIG. 12C is a graph of a change in consumption current.

FIGS. 12A and 12B are illustrations of a relation between a blank period and power consumption according to an embodiment of the present disclosure. FIG. 12C is a graph of a change in consumption current.

The blank period will be described with reference to FIG. 12A. In the photoelectric conversion device 100, one line is defined as a time period from when starting the idling operation to when restarting the idling operation. In the time period of the one line, all of a series of pixels output signals.

When the photoelectric conversion device 100 is used as, for example, a scanner, the time period of the one line is often determined by the restrictions of the apparatus on which the photoelectric conversion device 100 is mounted (e.g., paper feeding time).

Accordingly, when a second time period (e.g., 80 microsecond (µs)) from when the idling operation starts to when the output of all the series of pixels is completed is shorter than a first time period (that is, the time period of the one line) (e.g., 100 µs), there is a blank period between the first time period and the second time period, i.e., from when the output of all of the series of pixels is completed to when the next idling operation starts. In the blank period, any of the circuits is not operating.

All the series of pixels refer to, for example, pixels in a row in the main scanning direction.

As illustrated in FIG. 12A, during the blank period (100 µs−80 µs=20 µs), the circuits are not operating.

As illustrated in FIG. 12B, it is conceivable to use such a blank period for reducing power consumption. As described above, the time period (the second time period) until the process of the pixel X ends is shorter than the one line (the first time period), and the blank period occurs between when the process of the pixel X ends and when the idling operation restarts.

In the black period, the circuits (e.g., the dummy pixel signal generating block 14, the A-CDS circuit 41, and the ADC circuit 43) may be set to the standby mode in the photoelectric conversion device 100. This enables a reduction in consumption current.

However, as illustrated in FIG. 12C, the change in consumption current might affect the idling operation or operations following the idling operation in a next line.

That is, the power consumption does not return to the original value during the idling operation of the next line, which results in failed dummy pixel data 1 and 2 having undesired output values. Such failed dummy pixel data 1 and 2 is unsuitable for use as the correction data.

For example, if the current flowing through the power source with a wiring resistance of 10Ω (the current is also flowing to the GND, but the description of the GND is omitted for the sake of simplifying the explanation) changes by 100 mA, the power supply voltage of the A-CDS circuit 41 changes by 1 V according to the Ohm's law (an IR drop is 1 V).

That is, with a change in consumption current, the supply voltage of the circuit also changes, which means that the changes in the supply voltage of the circuits affect at least the output of the circuits due to the power supply rejection ratio of each circuit.

For this reason, the circuits continue running idle without switching to the standby mode in the blank period.

FIGS. 13A and 13B are illustrations of dummy pixel data and pixel data when the circuits are idle during the blank period.

The blank period in FIG. 13A is the same as the blank period in FIG. 12A. FIG. 13B differs from the FIG. 12B in that the circuits are idle during the blank period in FIG. 13B.

When the processing of the entire series of pixels ends, the photoelectric conversion device 100 idles the circuits idle until the first time period of the one line ends. This configuration can prevent the output values of the dummy pixel data 1 and 2 from being the wrong values (undesired values) while preventing the power consumption from decreasing.

There are some cases in which the circuits are difficult to idle during the blank period. For example, there is a case in which a one-time idling operation takes 60 ns whereas the blank period is for 50 ns. In such a case, the photoelectric conversion device 100 maintains the same operating status without idling the circuits (i.e., remains energized without performing any processing of data) during the blank period.

This is because, if the idling operation is terminated during the idling operation, the consumption current varies.

In the above description, the digital signal processing block 33 corrects the offsets of the A-CDS circuit 41 and the ADC circuit 43 using the dummy pixel data.

The offset includes a component that fluctuates over time (a component that fluctuates per line, i.e., a line fluctuation component) and a component that does not fluctuate over time (a fixed offset).

When the offset mainly includes the line fluctuation component only (the main factor is only the line fluctuation component), the dummy pixel data obtained immediately before the pixel data to be processed in the same line is used to correct the pixel data.

However, when the fixed offset is the main factor, other dummy pixel data, such as one in a different line, may be used to correct the pixel data, instead of using the dummy pixel data in the same line.

If noise singly occurs in the dummy pixel data in a certain line, using the dummy pixel data only in the certain line to correct the pixel data causes deterioration in characteristics of all the pixel data corrected by such dummy pixel data including noise.

To avoid such a situation, as illustrated in FIG. 4, any dummy pixel data currently and previously obtained is used to correct pixel data in the X line. For example, dummy pixel data Dx in the X line, dummy pixel data Dx-1 in the (X−1) line, and dummy pixel data Dx-2 in the (X−2) line are used.

Figure 14:
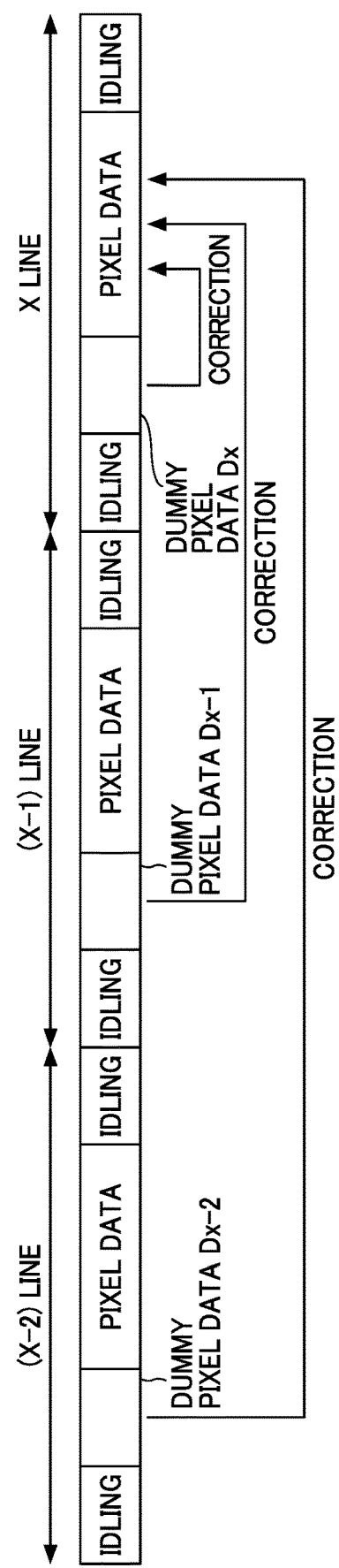
FIG. 14 is an illustration of a correction operation using dummy pixel data in a plurality of lines obtained prior to pixel data to be corrected, according to an embodiment of the present disclosure.

FIG. 14 is an illustration of a correction operation using dummy pixel data in a plurality of lines obtained prior to the pixel data to be corrected according to an embodiment of the present disclosure.

In FIG. 14, the pixel data of the X line is corrected by the dummy pixel data of the (X−1) line and the dummy pixel data of the (X−2) line.

In some examples, the average of the previous dummy pixel data (dummy pixel data of the X line=(Dx+Dx-1+Dx-2)/3) may be used to correct the pixel data. Considering the line fluctuation component, the dummy pixel data Dx, Dx-1, and Dx-2 may be weighted. For example, the dummy pixel data Dx, Dx-1, and Dx-2 are weighted such that Dx is greater than Dx-1, and Dx-1 is greater than Dx-2 (Dx>Dx-1>Dx-2), which means that the dummy pixel data in a line closer to the line of the pixel data to be corrected is weighted greater.

In some examples, the digital signal processing block 33 may correct the pixel data using the dummy pixel data in any line subsequent to the line of the pixel data to be corrected, instead of using the dummy pixel data in the previous lines (obtained prior to the line of the pixel data to be corrected).

Figure 15:
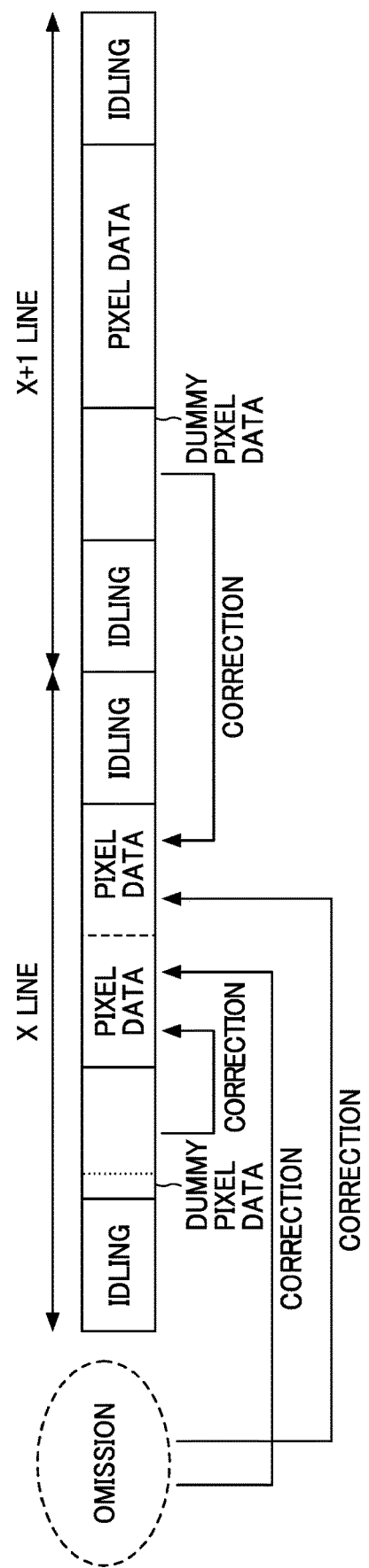
FIG. 15 is an illustration of a correction operation using dummy pixel data in a line one line after the line of the pixel data to be corrected, according to an embodiment of the present disclosure.

FIG. 15 is an illustration of a correction operation using dummy pixel data in a line one line after the line of the pixel data to be corrected, according to an embodiment of the present disclosure. Considering the line fluctuation component, any dummy pixel data obtained at a time close to the time at which the pixel data to be corrected has been obtained is more appropriate to use to correct the pixel data.

For example, dummy pixel data in a (X+1) line following the line of the pixel data to be corrected is used to correct the pixel data, in addition to using the dummy pixel data in the X line, the (X−1) line, and the (X−2) line.

However, in a case in which all the pixels in the X line are corrected using the dummy pixel data in the (X+1) line, there is a need to temporarily store all the pixels in the X line in a memory. Such a configuration adversely increases the circuit size.

In view of such a situation, the digital signal processing block 33 uses the dummy pixel data of the (X+1) line corresponding to approximately half of the pixel data of the X line at the most.

Figure 16:
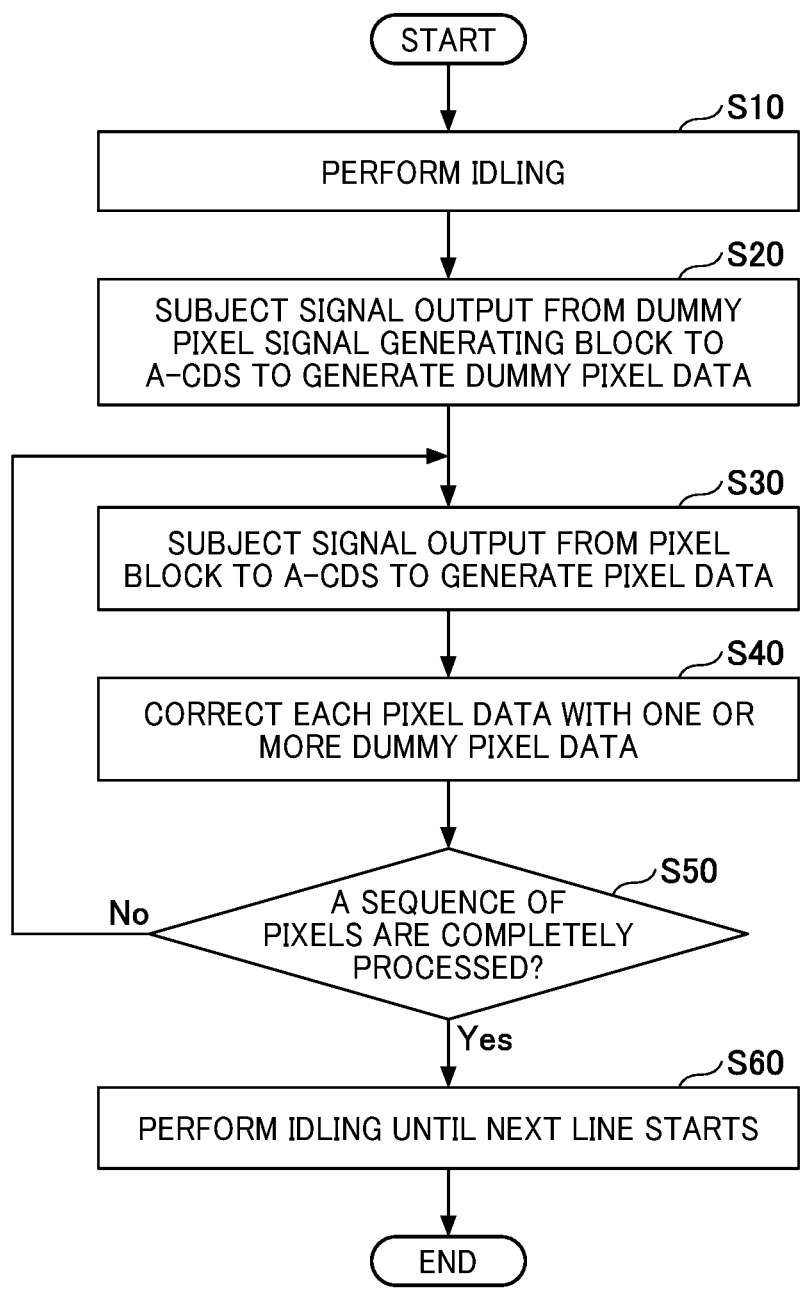
FIG. 16 is a flowchart for an overall processing of the photoelectric conversion device according to an embodiment of the present disclosure.

FIG. 16 is a flowchart for the overall processing of the photoelectric conversion device 100.

The processing of FIG. 16 starts when the photoelectric conversion device 100 is activated, for example. Further, the processing of FIG. 16 is executed by each processing system PS.

First, the photoelectric conversion device 100 performs an idling operation to wait until the signal of the dummy pixel signal generating block 14 becomes stable (step S10).

That is, the dummy pixel signal generating block 14, the A-CDS circuit 41, and/or the ADC circuit 43 is operated, and the obtained dummy pixel data is discarded and not used as correction data.

When the idling operation ends, the signal processing block 11 of the photoelectric conversion device 100 performs the A-CDS on the signal of the dummy pixel signal generating block 14 to generate dummy pixel data (step S20).

The number of dummy pixel data may be one or more. When a plurality of dummy pixel data is generated, an average of the plurality of dummy pixel data is used for correction.

Next, the signal processing block 11 of the photoelectric conversion device 100 performs the A-CDS on the signal of the pixel block 13 to generate pixel data (step S30).

That is, the signal processing block 11 generates pixel data of signals of a series of pixels 21 of the pixel block 13.

Next, the signal processing block 11 of the photoelectric conversion device 100 corrects each pixel data with one or more sets of dummy pixel data (step S40).

That is, the signal processing block 11 subtracts the dummy pixel data from the pixel data to generate originally intended signals (Vr1−Vs1) and (Vr2−Vs2).

The signal processing block 11 determines whether the processing of a predetermined series of pixels has been completed (step S50). In this case, the series of pixels is, for example, pixels arranged in one main scanning direction.

When a negative determination is made in step S50 (No in step S50), the process returns to step S30 to repeat the process of generating pixel data.

When an affirmative determination is made in step S50 (Yes in step S50), the photoelectric conversion device 100 performs the idling operation until the next line starts (step S60).

The photoelectric conversion device 100 repeatedly performs such processing S10 through S60. When the processing for the first line is completed, there is no need to perform the idling operation in step S10. Accordingly, the processes in step S20 through step S60 are performed for the second line.

Figure 17A:
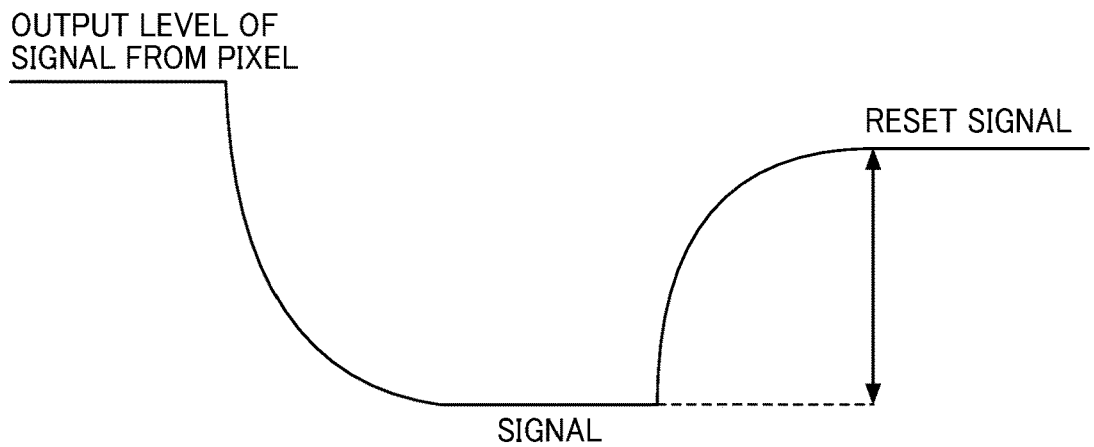
FIGS. 17A and 17B are illustrations of how to obtain A-CDS signals according to an embodiment of the present disclosure.
Figure 17B:
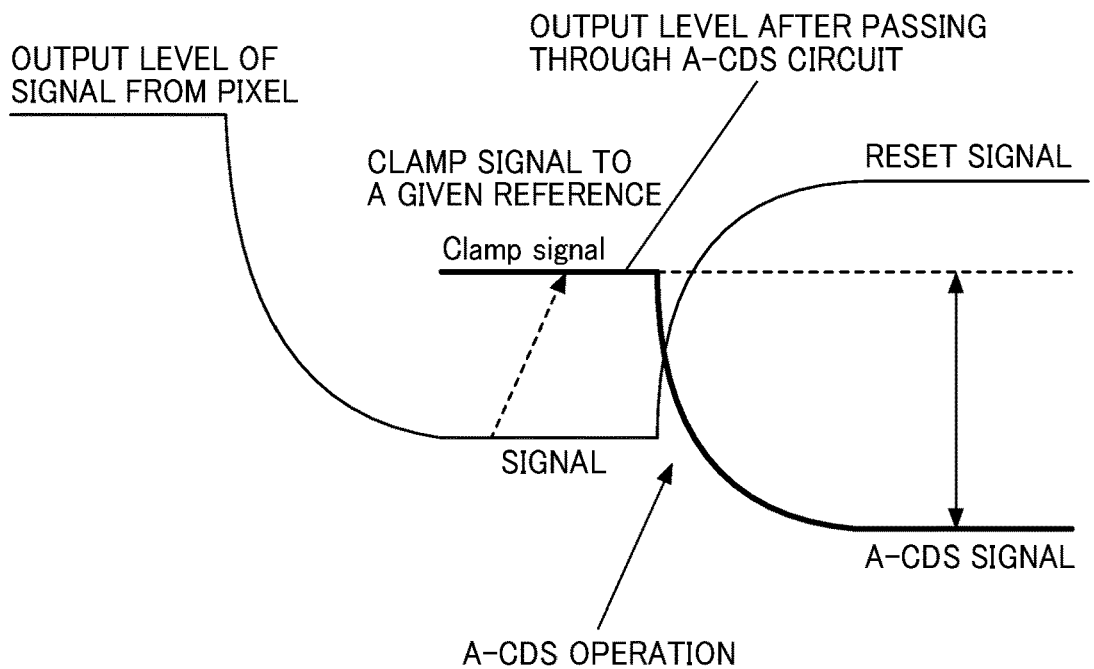

FIGS. 17A and 17B are illustrations of how to obtain A-CDS signals according to embodiments of the present disclosure. FIG. 17A is an illustration of the CDS, and FIG. 17B is an illustration of an A-CDS signal obtained from the A-CDS circuit.

As illustrated in FIG. 17A, the A-CDS circuit samples a signal and a reset signal and obtains the difference between the signal and the reset signal, which is the CDS.

Further, the A-CDS circuit outputs the A-CDS signal on the lower side with reference to the clamp signal using the inverting amplifier. This operation is called an A-CDS operation.

In the A-CDS operation, gain (amplification) is usually applied to the signal. However, without an application of gain, the difference between the reset signal and the signal is substantially equal to the difference between the clamp signal and the A-CDS signal. The clamp signal and the A-CDS signal are both subjected to the AD conversion, and thereafter the difference between the clamp signal and the A-CDS signal is obtained as a digital CDS (D-CDS).

Hereinafter, a description is given of some advantages according to the embodiments of the present disclosure.

As described above, the photoelectric conversion device 100 according to an embodiment of the present disclosure corrects the pixel data using the dummy pixel signal generated by the dummy pixel signal generating block 14 as correction data. This configuration enables a fixed pattern noise to be eliminated through fewer AD conversion operations than the comparative example does. Thus, the chip size and cost can be reduced.

The present disclosure is not limited to the details of the example embodiments described above, and various variations and improvements are possible.

For example, the photoelectric conversion device 100 of the present embodiment can be used in various imaging devices such as cameras, such as digital still cameras, digital video cameras, scanners, and smart phones, and copying machines.

Further, in the schematic configuration of the photoelectric conversion device 100 in FIG. 3, the functions of the signal processing block 11 are categorized into several groups to facilitate understanding of the processing of the signal processing block 11.

However, the present disclosure is not limited to the manner the functions are categorized into processing units and the name of the processing. The signal processing block 11 can also be categorized into more processing units according to processing contents. Alternatively, one processing unit may further include more sets of processing.

Note that the ADC circuit 43 is an example of an AD conversion circuit, the reference signal generator 28 is an example of a reference signal generator, and the PD 22 is an example of a photoelectric conversion element.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A photoelectric conversion device comprising:
a pixel block including a plurality of pixels, each of the plurality of pixels including:
photoelectric conversion circuitry to photoelectrically convert light striking the photoelectric conversion circuitry into pixel data and output the pixel data; and
reset circuitry to reset electrical charge of the photoelectrically converted pixel data and output a reset signal;
signal generating circuitry including reference signal generator circuitry to generate a reference signal; and
signal processing circuitry configured to:
perform correlated double sampling (CDS) on the reference signal to obtain correction data;
perform the CDS on the pixel data and the reset signal to generate an output signal; and
correct the output signal with the correction data,
wherein each of the plurality of pixels further includes a first amplifier circuit to amplify one of the pixel data and the reset signal,
wherein the signal generating circuitry includes a second amplifier circuit to amplify the reference signal, and
wherein the reset circuitry and the reference signal generator circuitry are identical circuits, and the first amplifier circuit and the second amplifier circuit are identical circuits, wherein, in the signal processing circuitry, the plurality of pixels shares a common amplifier circuit.

2. The photoelectric conversion device according to claim 1,
wherein the reference signal has a value equal to or substantially equal to a value of the reset signal.

3. The photoelectric conversion device according to claim 1,
wherein the signal processing circuitry further includes:
an amplifier circuit to amplify an analog signal; and
an analog-digital (AD) conversion circuit to convert the amplified analog signal to a digital signal,
wherein the number of at least one of the amplifier circuit and the AD conversion circuit is more than one, and
wherein a set of the amplifier circuit and the AD conversion circuit operates as a processing system that corrects the output signal with the correction data.

4. An image capturing device comprising the photoelectric conversion device according to claim 1.

5. A photoelectric conversion device comprising:
a pixel block including a plurality of pixels, each of the plurality of pixels including:
photoelectric conversion circuitry to photoelectrically convert light striking the photoelectric conversion circuitry into pixel data and output the pixel data, and
reset circuitry to reset electrical charge of the photoelectrically converted pixel data and output a reset signal;
signal generating circuitry including reference signal generator circuitry to generate a reference signal; and
signal processing circuitry configured to:
perform correlated double sampling (CDS) on the reference signal to obtain correction data;
perform the CDS on the pixel data and the reset signal to generate an output signal; and
correct the output signal with the correction data,
wherein the signal processing circuitry further includes:
an amplifier circuit to amplify an analog signal; and
an analog-digital (AD) conversion circuit to convert the amplified analog signal to a digital signal,
wherein the number of at least one of the amplifier circuit and the AD conversion circuit is more than one, and
wherein a set of the amplifier circuit and the AD conversion circuit operates as a processing system that corrects the output signal with the correction data,
wherein the signal processing circuitry performs an idling operation to correct the output signal without using the correction data until the reference signal output from the signal generating circuitry becomes stable, and
after ending the idling operation, the signal processing circuitry corrects the output signal with the correction data.

6. The photoelectric conversion device according to claim 5,
wherein each processing system of the signal processing circuitry performs the idling operation, and
wherein each system processing system performs the idling operation a common number of times.

7. The photoelectric conversion device according to claim 5,
wherein, when a first time period determined according to a restriction of the photoelectric conversion device is longer than a second time period from when the idling operation starts to when a series of pixels in the pixel block complete an output of the output signal, the signal processing circuitry continues performing the idling operation without becoming a standby state after the second time period ends and before the first time period ends.

8. The photoelectric conversion device according to claim 7,
wherein the signal processing circuitry weights the correction data obtained in the first time period, in which the output signal to be corrected has been output, and the correction data obtained in an another first time period before the first time period, so as to correct the output signal with the weighted correction data.

9. The photoelectric conversion device according to claim 7,
wherein the signal processing circuitry weights the correction data obtained in the first time period, in which the output signal to be corrected has been output, and the correction data obtained in still another first time period after the first period, so as to correct the output signal with the weighted correction data.

10. A photoelectric conversion method comprising:
photoelectrically converting light striking photoelectric conversion circuitry of a pixel block into pixel data and outputting the pixel data;
resetting electrical charge of the photoelectrically converted pixel data and outputting a reset signal;
generating a reference signal;
performing correlated double sampling (CDS) on the reference signal to obtain correction data;
performing CDS on the pixel data and the reset signal to generate an output signal; and
correcting the output signal with the correction data,
wherein the reference signal has a value equal to a value of the reset signal.

11. The photoelectric conversion method according to claim 10, further comprising:
amplifying one of the pixel data and the reset signal for each of a plurality of pixels of the pixel block using a corresponding first amplifier circuit; and
amplifying the reference signal using a second amplifier circuit,
wherein the first amplifier circuit and the second amplifier circuit are identical circuits.

12. The photoelectric conversion method according to claim 11, wherein:
the amplifying of the pixel data uses a common amplifier circuit for the plurality of pixels.

13. A photoelectric conversion method comprising:
photoelectrically converting light striking photoelectric conversion circuitry of a pixel block into pixel data and outputting the pixel data;
resetting electrical charge of the photoelectrically converted pixel data and outputting a reset signal;
generating a reference signal;
performing correlated double sampling (CDS) on the reference signal to obtain correction data;
performing CDS on the pixel data and the reset signal to generate an output signal;
correcting the output signal with the correction data;
performing an idling operation to correct the output signal without using the correction data until the reference signal becomes stable, and
after ending the idling operation, correcting the output signal with the correction data.

14. A photoelectric conversion device comprising:
a pixel block including a plurality of pixels, each of the plurality of pixels including:

photoelectric conversion circuitry to photoelectrically convert light striking the photoelectric conversion circuitry into pixel data and output the pixel data; and reset circuitry to reset electrical charge of the photoelectrically converted pixel data and output a reset signal;

signal generating circuitry including reference signal generator circuitry to generate a reference signal; and a signal processing block including:
   means for performing correlated double sampling (CDS) on the reference signal to obtain correction data;
   means for performing the CDS on the pixel data and the reset signal to generate an output signal; and
   means for correcting the output signal with the correction data, wherein the reference signal has a value equal to a value of the reset signal.

15. A photoelectric conversion device comprising:

a pixel block including a plurality of pixels, each of the plurality of pixels including:
   photoelectric conversion circuitry to photoelectrically convert light striking the photoelectric conversion circuitry into pixel data and output the pixel data, and
   reset circuitry to reset electrical charge of the photoelectrically converted pixel data and output a reset signal;

signal generating circuitry including reference signal generator circuitry to generate a reference signal; and a signal processing block including:
   means for performing correlated double sampling (CDS) on the reference signal to obtain correction data;
   means for performing the CDS on the pixel data and the reset signal to generate an output signal; and
   means for correcting the output signal with the correction data, wherein each of the plurality of pixels further includes a first amplifier circuit to amplify one of the pixel data and the reset signal, wherein the signal generating circuitry includes a second amplifier circuit to amplify the reference signal, and wherein the reset circuitry and the reference signal generator circuitry are identical circuits, and the first amplifier circuit and the second amplifier circuit are identical circuits.

16. The photoelectric conversion device according to claim 15, wherein, in the signal processing block, the plurality of pixels shares a common amplifier circuit.

* * * * *